Sept. 3, 1935.　　　　　J. C. LUMBERS　　　2,013,566
SHOCK ABSORBING MECHANISM FOR VEHICLES
Filed Aug. 10, 1933
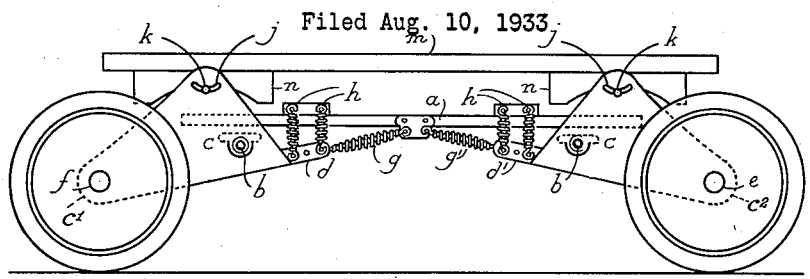
— Fig 1 —
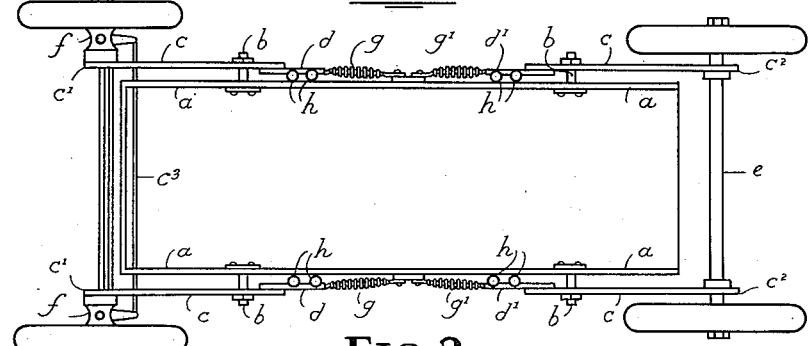
— Fig 2 —
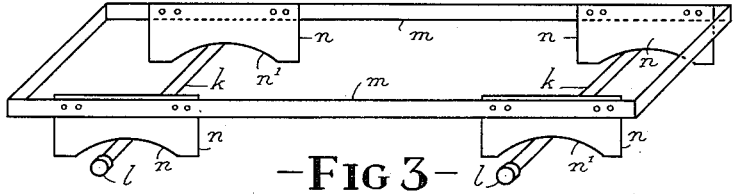
— Fig 3 —
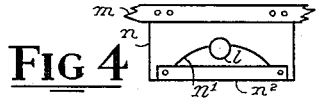 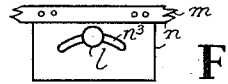
Fig 4　　　　Fig 5 —
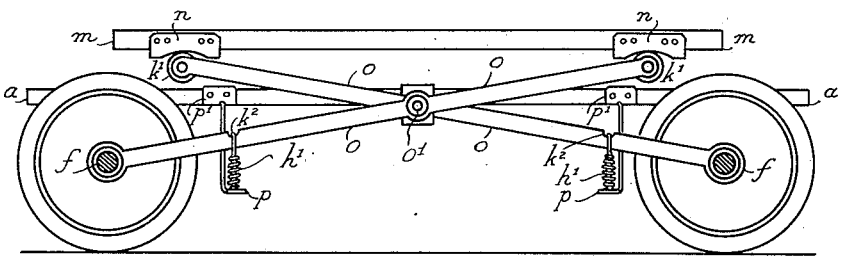
— Fig 6 —
James Cramond Lumbers
INVENTOR
By Otto Munk
his ATTY.

Patented Sept. 3, 1935

2,013,566

UNITED STATES PATENT OFFICE 2,013,566

SHOCK ABSORBING MECHANISM FOR VEHICLES

James Cramond Lumbers, Paradise, South Australia, Australia

Application August 10, 1933, Serial No. 684,495 In Australia August 19, 1932

1 Claim. (Cl. 280—106.5)

This invention relates to improved shock absorbing mechanism for vehicles and is applicable to the rolling gear of vehicles of all types.

It is the object of the invention to provide a simple mechanism by means of which shocks tending to move a vehicle underframe horizontally are absorbed or minimized as far as the occupants of the vehicle are concerned, by converting such horizontal movements into slight vertical movements of the vehicle.

But in order that my invention may be more clearly understood I will now describe the same by aid of the accompanying illustrative drawing wherein:—

Fig. 1 is a side elevation showing application of my device as applied to the chassis and underframe of the body of a road vehicle.

Fig. 2 is a plan of Fig. 1 with the frame of the body removed.

Fig. 3 is a perspective illustration of the frame of the body.

Fig. 4 illustrates a bearing plate provided with keeps for the retention of the roller.

Fig. 5 illustrates the roller accommodated in a radial slot.

Fig. 6 is a modification of the adjusting spring device between the body frame and the main underframe.

In each of the illustrations similar letters of reference are used to denote similar or corresponding parts wherever they occur.

In the drawing (Figs. 1 to 3) $a$ is the main underframe of the chassis and is fitted with strong pins $b$ which serve as bearers for the triangular supporting plates $c$, the plates being formed with a forward extension $c'$, and a rearward extension $c^2$. Upon the rearward portion of the back supporting plates the back axle $e$ is mounted within suitable bearings, and a corresponding axle is mounted on the front supporting plates. This arrangement may be used for rail vehicles. For road vehicles stub axles $f$ are fitted and are joined together by a steering connection rod $c^3$ of the customary construction.

Rearward and forward spring carrier arms $d$ and $d'$ projects towards each other from the inner ends of the triangular supporting plates and are resiliently attached to the main frame by strong springs $g$ and $g'$, preferably arranged as illustrated, but may be so arranged that they cross each other so as to obtain the benefit of extended length, and I also provide vertical compensating springs $h\ h$ to further compensate any oscillating or rocking motion. Hydraulic springs may be substituted as a mechanical equivalent, but I prefer to use helical coiled springs as illustrated.

I have illustrated these springs arranged in a convenient manner for a road vehicle, but they are subject to variation of construction and location provided the principal object of affording resiliency and recovery of position is not varied.

An important feature of my invention consists of a radial slot $j$ formed in the upper portion of the supporting plates $c$ as illustrated in Fig. 1.

These slots support rollers $k$ which serve as transverse supporting axles, and are more clearly illustrated in Fig. 3. The roller is furnished at each end with a flange $l$ (Fig. 3) to limit its lateral movement, and is prevented from dislodgment by a keep bar $n^2$ as in Fig. 4, or by using a slotted bearing $n^3$ as in Fig. 5.

The underframe of the body or upper part of the carriage or truck is outlined in Figs. 1 and 3 but is omitted in Fig. 2. In Figs. 1 and 3 it will be seen that the underframe of the body is fitted with bearing plates $n$, each having a concave bearing surface $n'$. These concave bearers on the body frame are situated opposite the centre of the radial slot $j$ of the underframe.

A modification of the spring supporting mechanism is illustrated in Fig. 6 in which the springs are mounted on interlocked rods. According to this illustration rods $o$ cross one another and are secured to the main underframe at their point of intersection by means of a strong pin $o'$. The upper ends of these rods may be provided with rollers $k'$, or similar self-adjusting bearings, corresponding with the compensating roller $k$ in Figs. 1 and 3.

The lower ends of the rods are suitably shaped at $k^2$ to form a holding for the vertical springs $h'$ corresponding with the springs $h$ in Figs. 1 and 2, and are in tension between the rods and the bearing plates $p$, the upper ends of which are attached at $p'$ to the main underframe $a$ so that resiliency is obtained and shocks are absorbed by the opening or closing movements of these rods.

Whilst I prefer to use helical coil springs as illustrated I may, nevertheless, substitute hydraulic springs when convenient and applicable.

The action of my invention may be described as follows:

If the vehicle to which the invention is applied meets with an obstruction such as a gutter in the road, or other impeding object, instead of the shock being taken wholly by the road wheels, it is transferred from the road wheels to the rocking plates $c$ which yield to an extent within the limit of the resiliency of the springs $g$, $g'$ and $h$. Thus the shock becomes absorbed and is not seriously felt by the occupant of the vehicle, and perishable goods are protected against the danger incidental to rough haulage.

This movement is also transmitted to the transverse compensating roller bars $k$ and it is received in a reduced ratio by the floor of the carriage or truck because instead of the floor receiving the full jolt or shock it rides on the concave surfaces $n'$ of the bearing plates $n$, and is in this way free to swing back and lessen the intensity of the shock, but it is prevented from becoming dislodged by reason of the keeps $n^2$ or other equivalent device, a portion of the shock being absorbed due to the slight elevation of the floor of the vehicle as it rises on the concave bearing surfaces $n'$ which rest upon the compensating rollers $k$.

Horizontal movements of the vehicle underframe with respect to the wheels will result in the displacement of roller bars $k$ over the cam surfaces $n'$. This will rock the spring tensioned plates $c$ whereby the horizontal movements are translated into vertical movements.

What I claim is:—

In shock absorbing mechanism for vehicles having transport wheels and axles, a frame for the body portion of a vehicle, bearing plates attached thereto, said bearing plates having longitudinal concave bearing surfaces, rollers extending across the width of the structure upon which the concave surfaces of the bearing plates are supported, flanged ends on the rollers and keeps attached to the bearing plates for preventing the dislodgment of the rollers, a main underframe provided with hinged plates having slots therein supporting the rollers, said hinged plates being mounted on said axles, and springs connecting the main underframe with the plates.

JAMES CRAMOND LUMBERS.